United States Patent [19]

Grimes et al.

[11] 3,939,362

[45] Feb. 17, 1976

[54] POWER PACK WITH SWITCH FOR PLURAL PRIMARY-SECONDARY CONNECTIONS

[75] Inventors: James E. Grimes; Joseph W. Rovan, both of Anaheim, Calif.

[73] Assignee: Disston, Inc., Pittsburgh, Pa.

[22] Filed: Dec. 5, 1974

[21] Appl. No.: 529,630

[52] U.S. Cl. .................. 307/150; 307/151; 321/8 R; 336/107; 336/192; 336/198

[51] Int. Cl.$^2$ .......................................... H02J 4/00

[58] Field of Search............ 307/150, 151; 321/8 R; 336/92, 105, 107, 192, 198, 208

[56] References Cited

UNITED STATES PATENTS

| | | | |
|---|---|---|---|
| 3,237,079 | 2/1966 | Mas | 321/8 R |
| 3,371,302 | 2/1968 | Mas | 321/8 R X |
| 3,387,244 | 6/1968 | Davis | 336/92 |
| 3,403,366 | 9/1968 | Klatte et al. | 336/92 |
| 3,711,806 | 1/1973 | Flentge | 336/92 |

*Primary Examiner*—William M. Shoop
*Attorney, Agent, or Firm*—B. B. Olive

[57] ABSTRACT

A power pack unit includes a casing and cover and a transformer subassembly having a molded bobbin of insulating material which receives primary and secondary lugs, a selected primary and a secondary winding configuration, laminations, A.C. terminals, connecting wiring, and a bobbin-mounted switch. This switch is positionable external of the casing for connecting selected primary or secondary taps as required to accommodate to a particular A.C. supply, i.e., 110 or 220 volt A.C., or to provide a selection of A.C. or D.C. output voltages.

6 Claims, 22 Drawing Figures

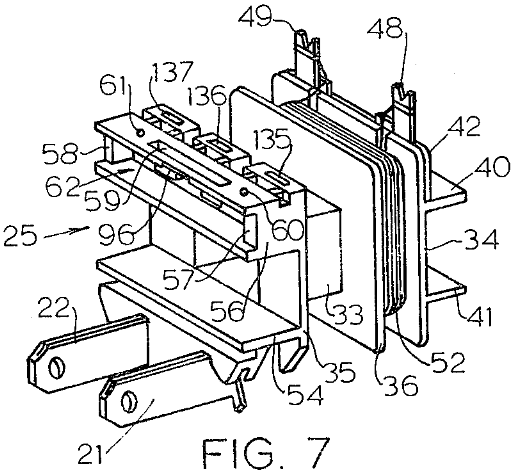
FIG. 7
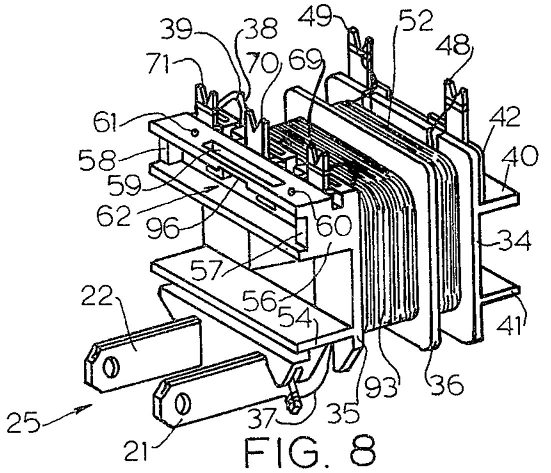
FIG. 8
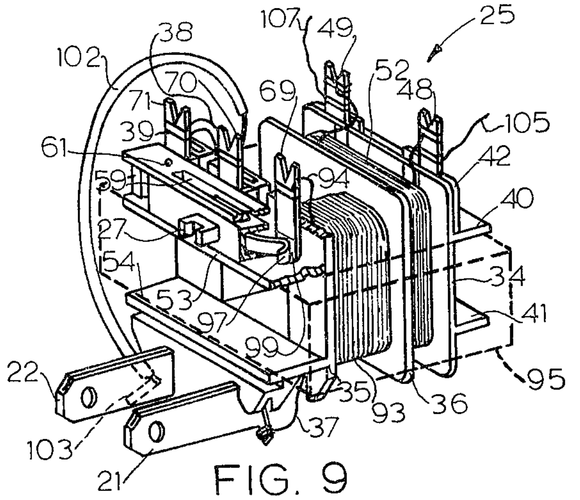
FIG. 9
FIG. 10
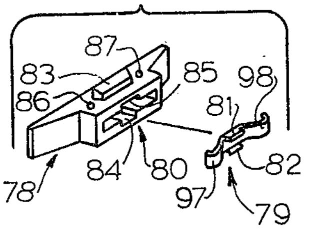
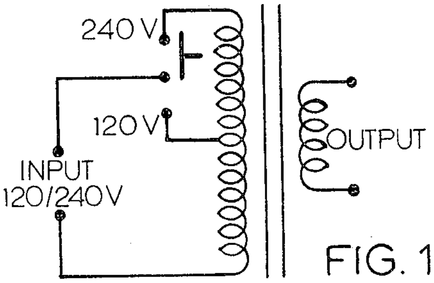
FIG. 19
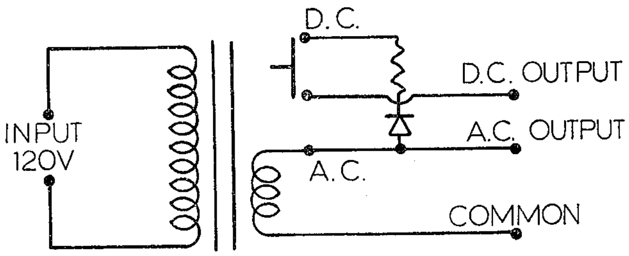
FIG. 21
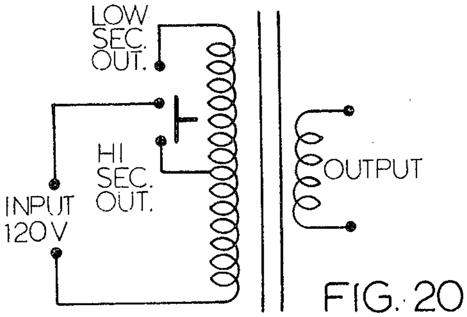
FIG. 20
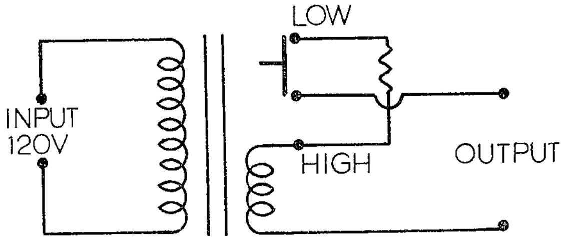
FIG. 22

POWER PACK WITH SWITCH FOR PLURAL PRIMARY-SECONDARY CONNECTIONS

BACKGROUND OF THE INVENTION

1. Field of the Invention

The present invention relates to a small power pack primarily intended for reducing an incoming line voltage of either 110 or 220 volts to provide a low voltage alternating current supply. With rectification, the pack may provide a selected low voltage direct current supply, a low voltage battery charger supply, or a choice of A.C. or D.C. supply voltages. The device is generally useful for small electrically-powered devices such as cordless grass shears, shrub trimmers, calculators, electric razors, and the like. The invention is more specifically related to the switch and multi-tap winding configurations employed in the pack.

2. Description of the Prior Art

The use of power packs is becoming more popular for small appliances where it is desired to operate the appliance at a voltage substantially lower than the 110/220 volt line voltage or to operate by battery. Power packs for small appliances, e.g., calculators, are presently being marketed where the 110 volt A.C. line voltage is reduced to 12 volts and can be rectified to provide D.C. voltage (see U.S. Pat. No. 3,711,806). Another example of power pack usage is where nickel cadmium batteries are employed for powering small appliances, e.g., portable grass and hedge shears, and a need to recharge the batteries from time to time requires the use of a reduced voltage operated battery charger power pack. The reduction of voltage to a lower level, e.g., below 30 volts R.M.S., by use of a power pack is significant to assist in obtaining Underwriters' Laboratories approval on appliances and other world agency approvals.

While domestically made power packs which are adapted for 110/220 volt incoming supply are available, their cost is too high. The main reasons of high cost reside in labor costs caused by excessive taping, staking, gluing and potting operations and by the nature of the switching devices necessitated to provide a power pack unit that will operate on 110 or 220 volts A.C. and will meet Underwriters' Laboratories approval. The switches used to switch from 110 to 220 volt supply or vice versa have been conventionally mounted on the casing or cover and have not been incorporated in the bobbin structure.

U.S. Pat. Nos. 3,711,806; 3,371,302 and 3,237,079 are illustrative of patents which are related to power pack construction and which illustrate related prior art devices and practices.

SUMMARY OF THE INVENTION

The power pack of the present invention is unique in that it eliminates many of the previously mentioned costly operations, can be used with either 110 or 220 volts A.C. incoming line voltage, provides an assembly that can be easily put together and one adapted to pass typical Underwriters' Laboratories tests.

While the power pack of the present invention includes a typical transformer in a casing, it is unique in construction of the bobbin and the method and means of switching from 110 to 220 volt operation. This eliminates certain procedures which are costly, while at the same time satisfying the rigorous standards of Underwriters' Laboratories. In this respect, the bobbin is initially formed to eliminate certain heretofore necessary taping.

The power pack of the invention uses a transformer subassembly assembled within a case and cover and from which project the A.C. input terminals. A uniquely designed bobbin mounts first and second primary windings, a secondary winding, primary and secondary lugs along with the A.C. terminals. The bobbin receives the lugs and terminals in such a way as to eliminate staking or gluing operations. The molded bobbin also mounts a slidable switch assembly which allows external positioning for switching from 110 volt to 220 volt operation depending upon which supply voltage is available. Finally, the transformer assembly is enclosed within a housing to eliminate potting and gluing operations and the housing is constructed to permit assembly by use of sonic welding, gluing or riveting. While primarily intended as a device for accommodating to either a 110 or 220 volt A.C. supply to provide a reduced voltage, the improved switch may be used with either the primary or secondary windings and may thus be employed to switch output as well as input and in various A.C. and D.C. configurations as later explained.

DESCRIPTION OF THE DRAWINGS

FIG. 7 is a perspective view of the bobbin with the A.C. terminals and secondary lugs in place and with only the secondary winding having been wound and connected.

FIG. 8 is a perspective view of the bobbin similar to FIG. 7 but with the primary lugs and first and second primary windings wound and connected.

FIG. 9 is a perspective view similar to FIG. 8 but with the switch and jumper wire connected and with a portion of the bobbin, switch and primary windings broken away and with the laminations in dashed lines for clarity.

FIG. 10 is an exploded perspective view of the switch and contact spring used in the invention.

FIGS. 19–22 illustrate typical winding configurations with which the invention may be employed either for A.C. or D.C. supplies.

DESCRIPTION OF THE PREFERRED EMBODIMENT

Figure 1:
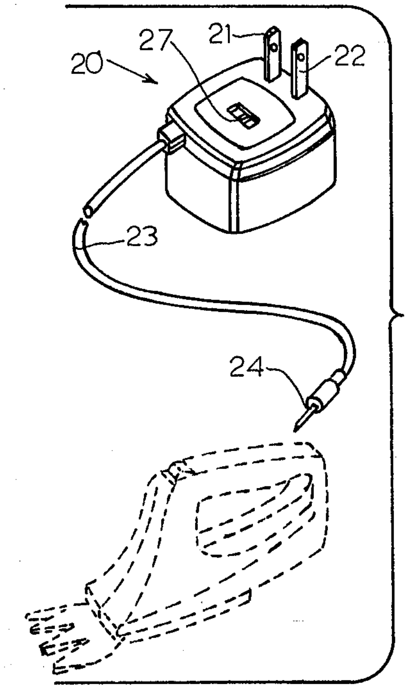
FIG. 1 is a perspective view of the power pack according to the invention and illustrating in phantom a grass shear that may be connected to, and whose battery pack can be charged by, the invention power pack, as one example of usage.

Referring now to the drawings and particularly to FIG. 1, the power pack of the invention, generally designated by the numeral 20, is illustrated as having A.C. terminals 21, 22 (standard North American type being shown) adapted to be insertable in a standard electrical wall supply outlet of either 110 or 220 volts, and a secondary cord 23 having a plug 24 adapted to engage terminals of an electrical apparatus such as a battery operated grass shear or a portable electronic calculator. The power pack, when used for voltage reduction, functions to reduce the wall outlet voltage to a lower voltage which lessens the possibility of incurring dangerous electrical shock from or destruction or damage to the device being supplied. For example, where the wall outlet voltage is 110 or 220 volts A.C., the voltage is typically reduced to under 30 volts R.M.S.

Power pack 20 of the invention can be applied in various ways and for various uses of which the following is illustrative: (1) as an A.C. transformer with 110 or 220 volts on the primary, (2) as a battery charger by adding a rectifier, not shown, and which can also operate on 110 or 220 volts A.C., or (3) as a D.C. power supply operating on 110 or 220 volts A.C. by adding a rectifier and filter, not shown.

The power pack construction 20 includes a molded electrical insulating plastic case 30 and cover 31 which encloses a transformer subassembly 25. The case, generally indicated by the numeral 30, FIGS. 11–14, after having transformer subassembly 25, FIGS. 2–9, inserted therein, is closed by cover 31, FIGS. 15–18, which is welded, glued, riveted, or otherwise secured to case 30.

Transformer subassembly 25 includes a uniquely formed bobbin 32 molded of a suitable electrical insulating plastic, such as nylon, Delrin, or the like. Bobbin 32 supports the multiple lugs, transformer windings, the transformer laminations (indicated only in FIG. 9 for clarity), secondary terminals and primary terminals which will now be discussed in more detail. As seen particularly in FIGS. 2–9, bobbin 32 includes a hollow, tubular portion 33 of rectangular cross section and having a first flange 34, a second flange 35 and an intermediate flange 36. The end flanges 34 and 35 both serve as terminal supports; flange 35 also serves as a switch support; and flange 36 serves to physically separate and insulate the primary and secondary windings.

First flange 34 has a pair of outwardly extending shelves 40, 41, between which are received the usual laminations forming core 95 indicated in FIG. 9, but otherwise not shown, for clarity. The upper portion 42 of flange 34 is thickened down to the point where shelf 40 extends outward therefrom. Vertical slots 43, 44, 45, 46, 47 are molded into thickened portion 42 of flange 34. Slots 43 and 47 respectively receive a pair of secondary lugs 48, 49 which are barbed or otherwise formed on their mounted ends such that slots 43, 47 receive lugs 48, 49 in a tight press fit to avoid gluing, or the like. Of course, additional secondary lugs and slots may be employed as needed for the particular application. Space 51 between flange 34 and flange 36 is, of course, made sufficiently wide and deep for later receiving the secondary winding 52. Similarly, space 74 is adapted to receive the primary winding, as later described. The flanges collectively insulate the core.

Intermediate flange 36 extends completely around the hollow tube portion 33 of bobbin 32 and acts to separate and insulate the primary windings from the secondary windings. Flange 36 is molded integral with hollow tube portion 33 and is shown molded in this particular embodiment substantially closer to flange 34 than to flange 35. Such spacing will, of course, depend on the particular winding sizes.

The second flange 35 has shelves 53, 54 between which are mounted the core laminations 95 (FIG. 9). Upper shelf 53 is shaped so that it has a top portion 55, a bottom portion 56, and closure sides 57, 58 which together form a switch receiving cavity 62. Top portion 55 includes an elongated slot 59 whose function is later described. In addition to slot 59, a pair of holes 60, 61 are formed in top portion 55. Hole 60 is located on one end of slot 59 and hole 61 is located on the opposite end of slot 59.

A series of vertical slots 64, 65, 66, 67, 68 extend into the back of shelf 53. Slots 64, 66 and 68 are adapted to receive in a locking arrangement respectively primary lugs 69, 70, and 71. Another set of adjacent slots 135, 136 and 137 also extend down into the back of shelf 53 and are employed to minimize sink when the plastic cools. As with lugs 48, 49, lugs 69, 70 and 71 are barbed or otherwise formed to be tightly press-fitted into their respective slots.

Lower shelf 54 of flange 35 extends outwardly from flange 35. Shelf 54 has, made integral with its bottom surface, a downwardly extending portion 75 which is shaped and molded as illustrated so that it readily receives the mounting ends of a pair of A.C. terminals 21, 22 in a sliding, press fit relation in appropriate terminal receiving slots 76, 77. Terminals 21, 22 are, of course, formed in a manner suited to such form of mounting in the assembly process.

Figure 2:
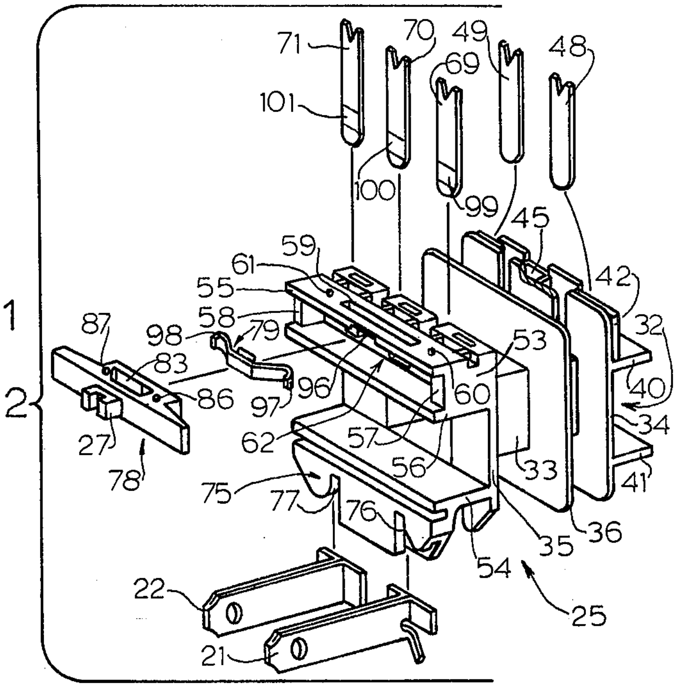
FIG. 2 is an exploded perspective view of some of the components of the transformer portion of the present invention.
Figure 3:
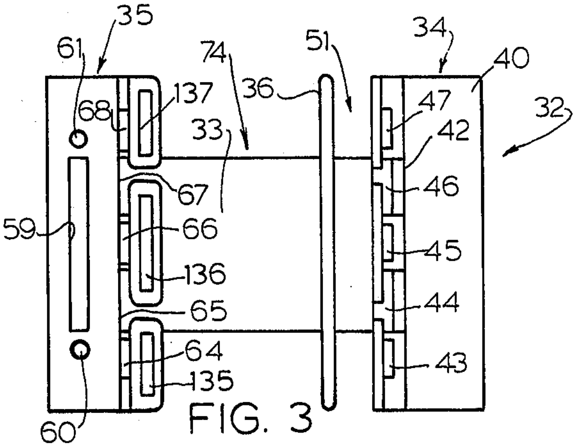
FIG. 3 is a top plan view of the transformer bobbin of the invention.
Figure 4:
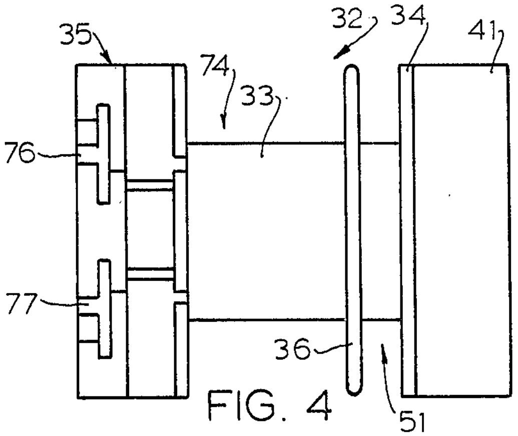
FIG. 4 is a bottom plan view of the transformer bobbin.
Figure 5:
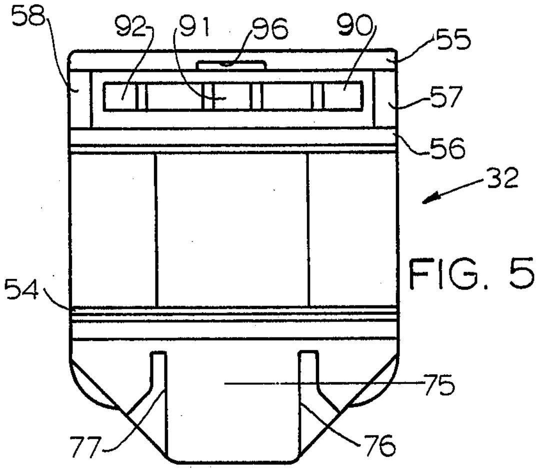
FIG. 5 is a front elevation view of the transformer bobbin.
Figure 6:
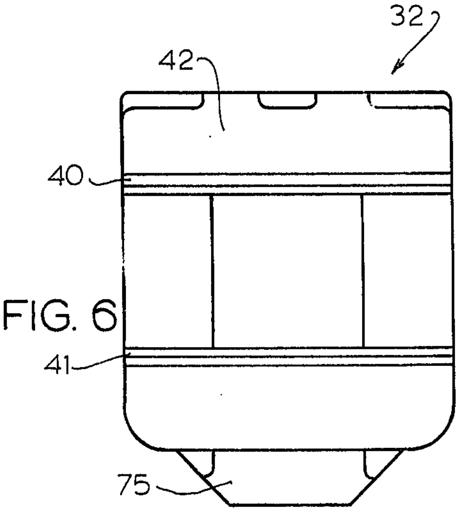
FIG. 6 is a rear elevation view of the transformer bobbin.
Figure 11:
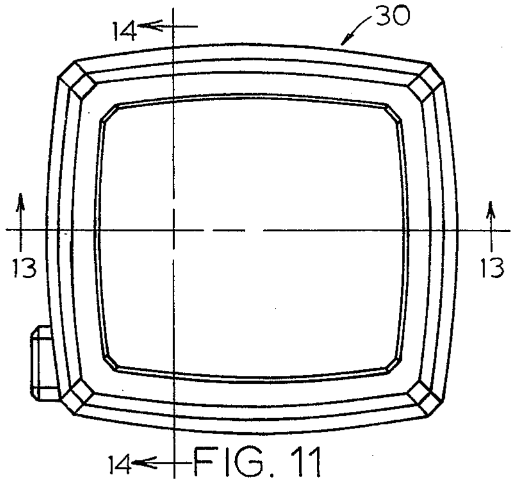
FIG. 11 is a plan view of the top of the power pack case into which the transformer subassembly is placed.
Figure 12:
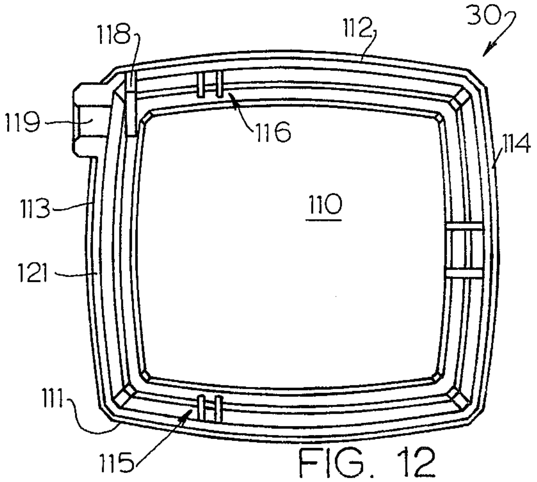
FIG. 12 is a plan view looking inside the power pack case into which the transformer subassembly is placed.
Figure 13:
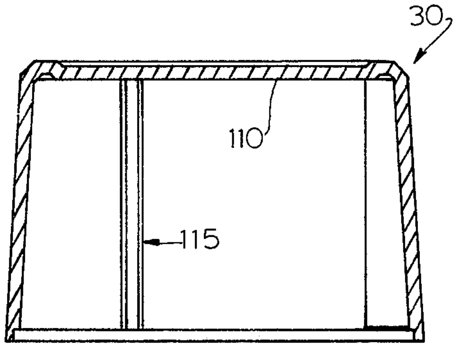
FIG. 13 is a section view taken generally along line 13—13 of FIG. 11.
Figure 14:
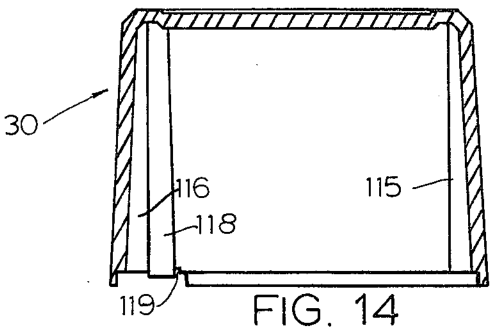
FIG. 14 is a section view taken generally along line 14—14 of FIG. 11.
Figure 15:
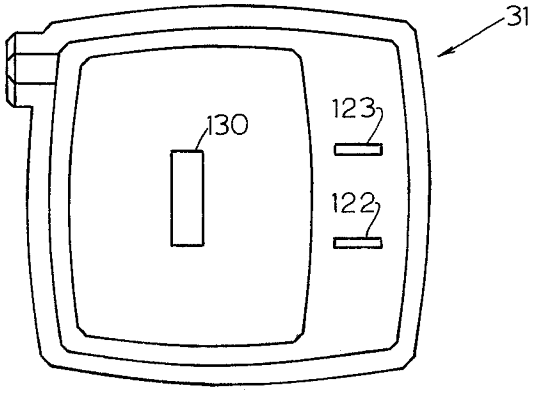
FIG. 15 is a top plan view of the cover for the power pack case.
Figure 16:
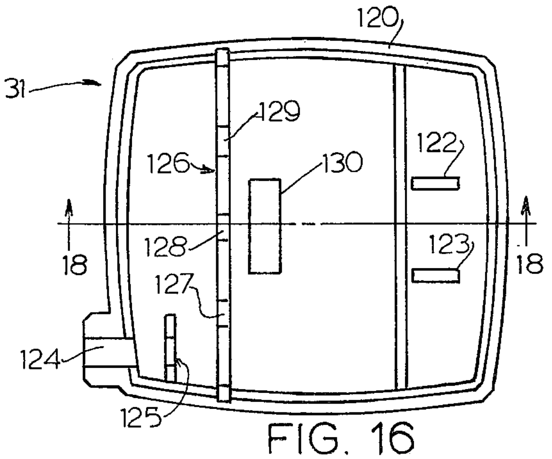
FIG. 16 is a bottom plan view of the inside of the cover for the power pack case.
Figure 17:
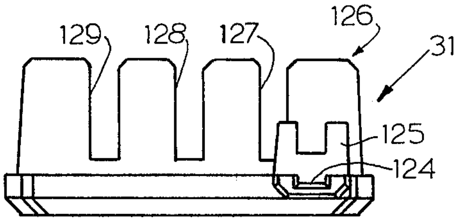
FIG. 17 is a side elevation view of the cover for the power pack case.
Figure 18:
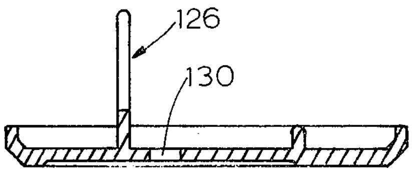
FIG. 18 is a section view taken along line 18—18 of FIG. 16.

Referring now to FIGS. 2, 9 and 10, there is illustrated a slidable contact switch 78 and contact spring 79 which mount on bobbin 32 and provide for 110/220 volt switching. Contact switch 78 is designed and molded as illustrated so that contact spring 79 may reside within slot 80 and be held therein by retention tabs 81, 82 engaging and being held in retention slots 84, 85. It may also be noted that switch 78 has an integral molded ramp tab 83 which is slidably received by the elongated slot opening 59. Also molded integral with switch 78 are a pair of dimples 86, 87 which, when switch 78 is moved to one side a predetermined amount, allow dimple 86 to reside in hole 60 or, if switch 78 is moved the other way a similar amount, allow dimple 87 to reside in hole 61 in a detent-like action. Contact spring 79 also has contact surfaces 97, 98 which pass within openings 90, 91, 92 so that contact may be made with primary lugs 69, 70, 71 at surfaces 99, 100, 101 (FIG. 2) as desired for purposes of switching as later described.

The description is next directed to assembly of transformer subassembly 25. Referring particularly to FIGS. 2, 9 and 10, the assembly begins with the press-fit insertion of the A.C. terminals 21, 22 into the terminal slots 76, 77 in the downwardly extending portion 75 of flange 35. Primary lugs 69, 70, 71 are next inserted into slots 64, 66, 68 respectively as found in the top portion 55 of flange 35. Secondary lugs 48, 49 are inserted into slots 43, 47 in thickened portion 42 of flange 34.

Secondary coil 52 is wound on the hollow tube portion 33 of bobbin 32 and resides between flange 34 and flange 36. The winding of coil 52 starts with one coil wire being attached to secondary lug 48. Coil 52 is then wound the required number of turns and the end of the last turn is brought up and attached to secondary lug 49 which completes the winding of secondary coil 52. Of course, with some applications, three lugs and a tap may be employed with the secondary and the assembly operation would be modified accordingly.

Next, the first section of the primary coil 93 is wound with start lead 37 being connected to A.C. terminal 21 and the intermediate leads 38, 39 are connected to primary lug 71. The second section of primary coil 93 is wound ending with the final lead 94 connected to primary lug 69. All leads are dip soldered, and laminated core 95 (FIG. 9) is assembled around bobbin 32. Core 95 surrounds bobbin 32 and coils 93 and 52 and also extends through the center of hollow rectangular cross section 33 of bobbin 32 to magnetically couple the coils 93 and 52 according to conventional practices. Core 95 resides between shelves 40, 41 and shelves 53, 54 and is insulated from coils 93 and 52 on the sides by flanges 34, 35, 36.

An important feature of the invention concerns the 110/220 volt switch being mounted on the bobbin structure. In this regard, it may be noted that contact switch 78 is now assembled by pressing contact spring 79 into slot 80 of switch 78. An interference with tabs 81, 82 in retention guides 84, 85 retains spring 79 in switch 78. The assembled switch 78 and spring 79 are pressed into the cavity 62 as illustrated in FIGS. 2 and 9. Ramp tab 83 is lined up with slot 96, moved inwardly and located in slot 59 where it locks in place but is now capable of sliding back and forth in slot 59 for switching purposes. Jumper wire 102 is attached between lug 70 and tab 103 on A.C. terminal 22.

Switch 78 can now be actuated by moving tab 27 in one direction (left to right in FIG. 9) for the 110 volt supply mode where switch spring surface 97 makes contact with lug surface 99 of primary lug 69 and switch surface 98 makes contact with lug surface 100 of primary lug 70, as illustrated in FIGS. 2 and 9. Switch 78 is detented or cocked in place by dimple 86 fitting into hole 60 of top portion 55 of shelf 53 of flange 35. Tab 27 can also be moved in the opposite direction (right to left in FIG. 9) for the 220 volt supply mode where switch surface 98 makes contact with lug surface 101 and switch surface 97 makes contact with lug surface 100. Switch 78 is now detented or cocked in place by dimple 87 fitting into hole 61 of top portion 55 of shelf 53 of flange 35.

Secondary cord 23 is attached to transformer subassembly 25 by connecting secondary lead 105 to secondary lug 48 and by connecting secondary lead 107 to secondary lug 49. The subassembly is now essentially complete for placement in its case 30. FIGS. 11-18 illustrate the case and cover construction.

Case 30 includes a bottom wall 110, opposite upstanding sidewalls 111, 112 and front and back walls 113 and 114. Guide slots 115, 116 in sidewalls 111, 112 are molded as integral parts thereof as in guide slot 117 of back wall 114. Upstanding wall 118 adjacent front wall 113 helps to provide, along with cord groove 119 of front wall 113, a cord strain relief section for secondary cord 23. Cord 23 passes over wall 118 and passes along groove 119.

Cover 31 is essentially flat and provided with a peripheral skirt 120 which coacts with a peripheral ledge 121 of case 30 during assembly of cover 31 onto case 30. A.C. terminal openings 122, 123 are provided in cover 31 and through which A.C. terminals 21, 22 extend. Switch opening 130 is molded into cover 31 and receives tab 27 of switch 78 when subassembly 25 is inserted into case 30 and cover 31 is put into place. Switch 78 even though mounted internally on bobbin 32 is, thus, made operable externally of the case.

A mating cord groove 124 is molded into cover 31 as short upstanding wall 125 mates with wall 118 of case 30. Walls 118 and 125 effectively prevent movement of cord 23. A guide wall 126, molded integral with flat cover 31, has grooves 127, 128, 129 therein for alignment purposes. As A.C. terminals 21, 22 are inserted into terminal openings 122, 123, grooves 127, 128, 129 respectively receive primary lugs 69, 70, 71. Once subassembly 25 has been mounted on cover 31 so that cord 23 rests on wall 125 and passes over groove 124, case 30 can be placed over subassembly 25 so that the outside ends of guide wall 126 slide easily into guide slots 115, 116 in sidewalls 111, 112. Grooves 119 and 124 and walls 118 and 125 align and cover 31 and case 30 come together as a unit. Finally, cover 31 and case 30 are secured together by any suitable means such as sonic welding, gluing or riveting.

From the foregoing, it can be seen that many of the usual taping and other assembly operations long associated with the manufacture of small power packs have been eliminated. Of particular significance is the bobbin mounted externally operated switch arrangement which provides a radically improved means for switching from one voltage supply input or output level to another. While 110 volt and 220 volt input supplies are typical, it will, of course, be understood that the invention is useful with any conventional dual voltage power pack supply. Further, by adding lugs and taps to either the primary or secondary side, the switch arrangement may be adapted to select various voltage levels on either the primary or secondary side. Typical applications are illustrated in FIGS. 19–22. FIG. 19 illustrates use of the invention with dual A.C. levels as a primary switch. FIG. 20 illustrates use of the invention as a primary switch to vary the output. FIG. 21 also illustrates use of the invention as a secondary switch but to provide either an A.C. or D.C. output. FIG. 22 illustrates another application as a secondary switch but for the purpose of giving a choice of two A.C. output levels. In all such applications, the switch terminals and lugs may be incorporated into the bobbin structure as previously explained. Thus, the many advantages of the invention are seen to have widespread application for both primary and secondary switching. That is, the mating switch cavity-switch assembly may be employed on either the primary or secondary side as represented in FIGS. 19–22. The locations of the various slots or cavities for receiving the lugs, terminals and switch assembly will, of course, vary with the application. Also, other types of manual switches and electrical contactors could be embodied in the bobbin as taught by the invention. It is preferred, however, that the switch operator and primary terminals always extend through the cover or a common housing wall which will prevent or deter switching except when the pack is removed from the wall outlet whenever such an outlet is used as the primary voltage source.

What is claimed is:

1. In a power pack for use with small electrical appliances to provide an operating voltage from a line voltage, comprising:

a. a case and cover assembly for housing a transformer core and winding subassembly;

b. a transformer subassembly in the housing including:

1. a bobbin molded of electrical insulating material and formed with a plurality of isolated cavities adapted for receiving and mounting soldering lugs, primary terminals and a switch assembly and formed with the other integral insulating formations for receiving and insulating the core from the windings;

2. primary and secondary windings wound on the bobbin;

3. primary and secondary soldering lugs secured in respective ones of said cavities and connected to selected taps on the windings;

4. primary terminals secured to the bobbin in other respective said cavities and connected to the primary winding, said primary terminals projecting from the cover for engaging a wall outlet to connect to the line voltage;

5. a laminated core secured to the bobbin and surrounding the windings and being insulated therefrom by said insulating formations;

6. a switch assembly mounted and retained in said switch assembly cavity formed in the bobbin, said switch assembly including a movable switch member with an operator member extending through and operable externally of said case and cover assembly with an electrically conducting contactor member operative in one position to electrically connect a tap on one side of said windings with a first circuit configuration on that side and with said operator member in an opposite position being operative to electrically connect a tap on the same side into a second circuit configuration on that side, said circuit configurations being operative in conjunction with said core, windings and the circuit configuration of the opposite side to provide a particular character of supply voltage for each said position.

2. In a power pack as claimed in claim 1 wherein said primary lug cavities are proximate the switch assembly cavity, selected uninsulated portions of said primary lugs are positioned adjacent said switch assembly cavity and said contactor member establishes connection with said electrical configurations by contacting said uninsulated portions of selected pairs of said primary lugs in both said switch positions.

3. In a power pack as claimed in claim 1 wherein in one said switch position said primary terminals are connected through said contactor member to taps associated with a relatively high primary line voltage and in the other switch position are connected through said contactor member to taps associated with a relatively low primary line voltage such that in either position the secondary supply voltage remains the same.

4. In a power pack as claimed in claim 1 wherein said secondary lug cavities are proximate the switch assembly cavity, selected uninsulated portions of said secondary lugs are positioned adjacent said switch assembly cavity and said contactor member establishes connection with said electrical configurations by contacting said uninsulated portions of selected pairs of said secondary lugs in both said switch positions.

5. In a power pack as claimed in claim 1 wherein said operator member extends through said cover adjacent said primary terminals in a manner deterring operation of said operator member except when said terminals are removed from said outlet.

6. In a power pack for use with an electrical energy consuming device to provide an operating supply voltage from a line voltage, comprising:

a. a housing;

b. a transformer subassembly in the housing including:

1. a bobbin molded of electrical insulating material and having a portion formed for receiving and mounting a mating switch assembly, having other integral insulating formations for receiving and insulating the core from the windings and having a plurality of primary and secondary soldering lugs secured to the bobbin;

2. primary and secondary windings wound on the bobbin and having taps selectively connected to selected corresponding said lugs;

3. a switch assembly mounted on said bobbin in said portion formed to receive such assembly, said switch assembly including an operator member extending through and operable externally of said housing, and with an electrically conducting contactor member operative with said operator member in one position to electrically connect one side of said windings and lugs in one electrical configuration operative to provide a supply voltage of selected character and with said operator member in another position to electrically connect the same side in another electrical configuration operative to provide a supply voltage of another selected character.

* * * * *